(12) United States Patent
Nishigaki

(10) Patent No.: US 7,313,059 B2
(45) Date of Patent: Dec. 25, 2007

(54) PLAYBACK APPARATUS, METHOD, AND RECORDING MEDIUM FOR DEFECT PERIOD PROCESSING AND POST-DEFECT PERIOD PROCESSING

(75) Inventor: Makoto Nishigaki, Saitama (JP)

(73) Assignee: Sony Corporation, Tokyo (JP)

( * ) Notice: Subject to any disclaimer, the term of this patent is extended or adjusted under 35 U.S.C. 154(b) by 58 days.

(21) Appl. No.: 11/112,485

(22) Filed: Apr. 21, 2005

(65) Prior Publication Data

US 2005/0185536 A1 Aug. 25, 2005

(51) Int. Cl.
*G11B 7/005* (2006.01)

(52) U.S. Cl. .............................. 369/44.32; 369/47.14; 369/53.15

(58) Field of Classification Search .................. None
See application file for complete search history.

(56) References Cited

U.S. PATENT DOCUMENTS

| | | | |
|---|---|---|---|
| 4,688,202 A | 8/1987 | Mukai et al. | |
| 4,701,603 A | 10/1987 | Dakin et al. | |
| 4,703,468 A | 10/1987 | Baba et al. | |
| 4,722,079 A | 1/1988 | Matsumoto | |
| 4,764,860 A | 8/1988 | Takao | |
| 5,245,599 A | 9/1993 | Ishii et al. | |
| 5,436,877 A | 7/1995 | Ohshima | |
| 5,481,526 A | 1/1996 | Nagata et al. | |
| 5,623,465 A | 4/1997 | Sasaki et al. | |
| 5,818,804 A | 10/1998 | Obata et al. | |
| 6,510,112 B1 | 1/2003 | Sakamoto et al. | |

*Primary Examiner*—Andrea Wellington
*Assistant Examiner*—Michael V Battaglia
(74) *Attorney, Agent, or Firm*—Frommer Lawrence & Haug LLP; William S. Frommer; Thomas F. Presson

(57) ABSTRACT

A playback apparatus for reproducing data recorded on a disk medium by using an optical pickup, the playback apparatus comprising: RF signal generating means, data signal generating means, defect signal generating means, focus error signal generating means, focus servo control means, tracking error signal generating means, tracking servo control means, monitoring means, and defect period processing control means for controlling the focus servo control means and the tracking servo control means, wherein the focus servo control means and the tracking servo control means perform defect period processing when a result of the monitoring by the monitoring means indicates the defect period.

7 Claims, 11 Drawing Sheets

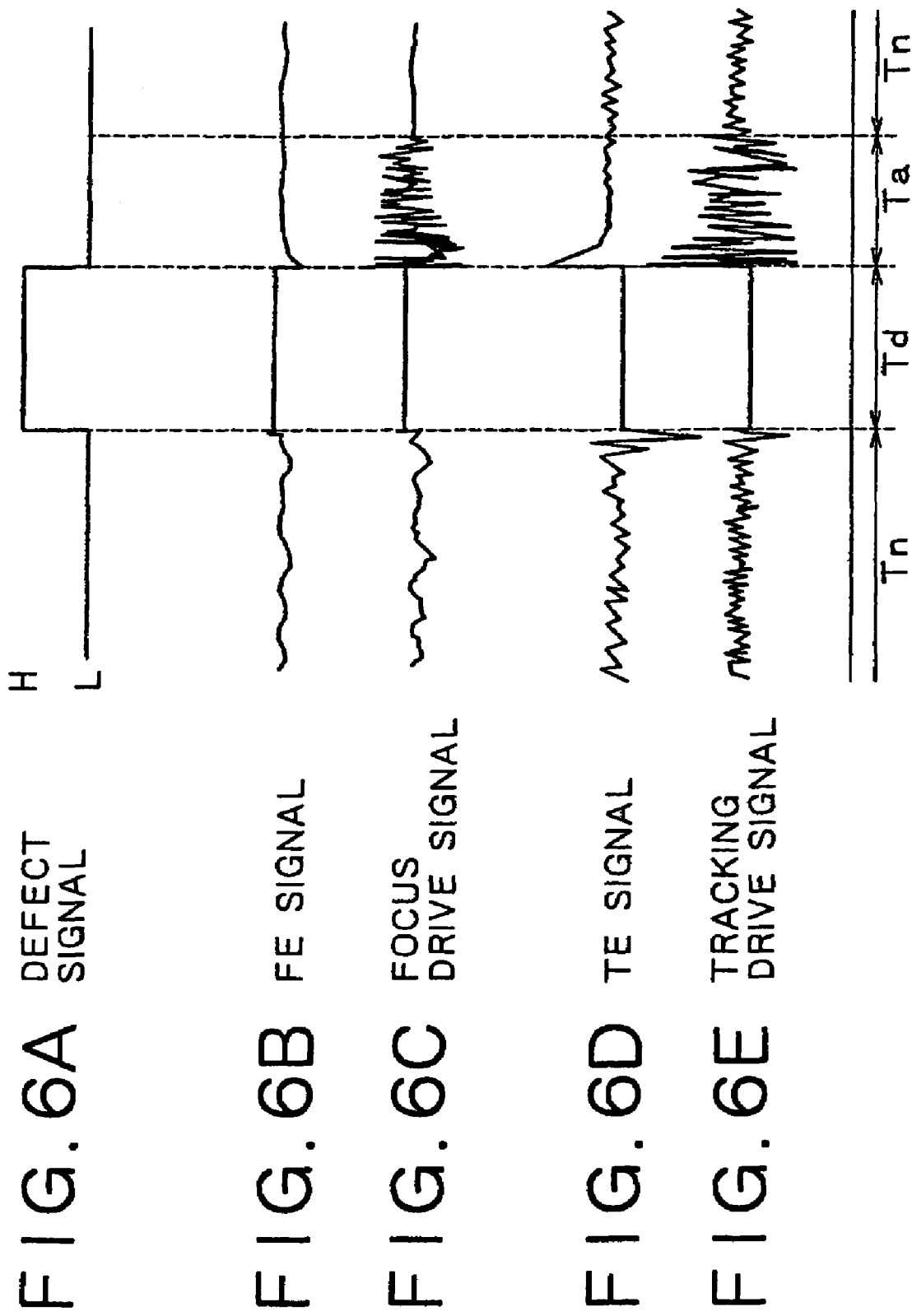

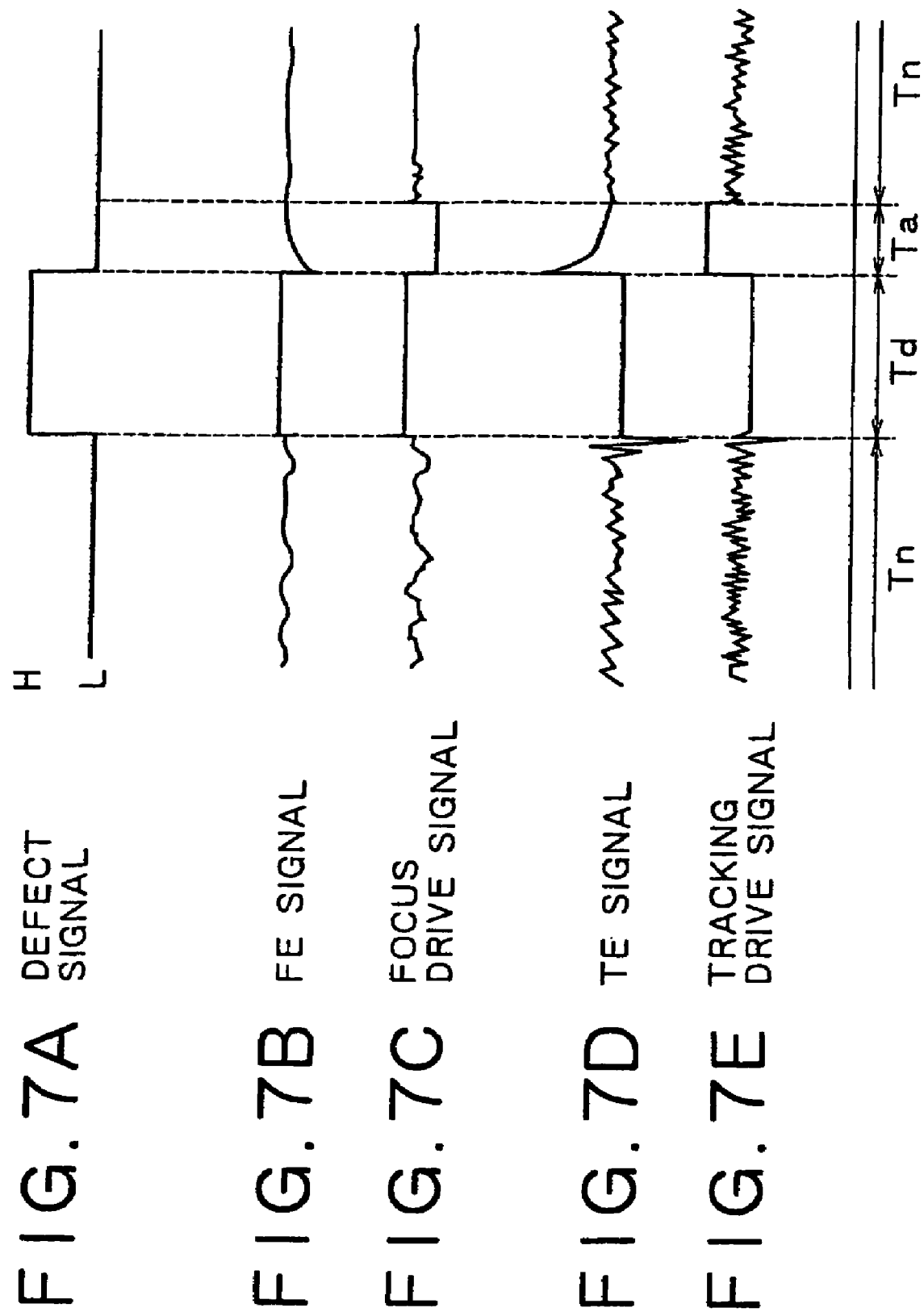

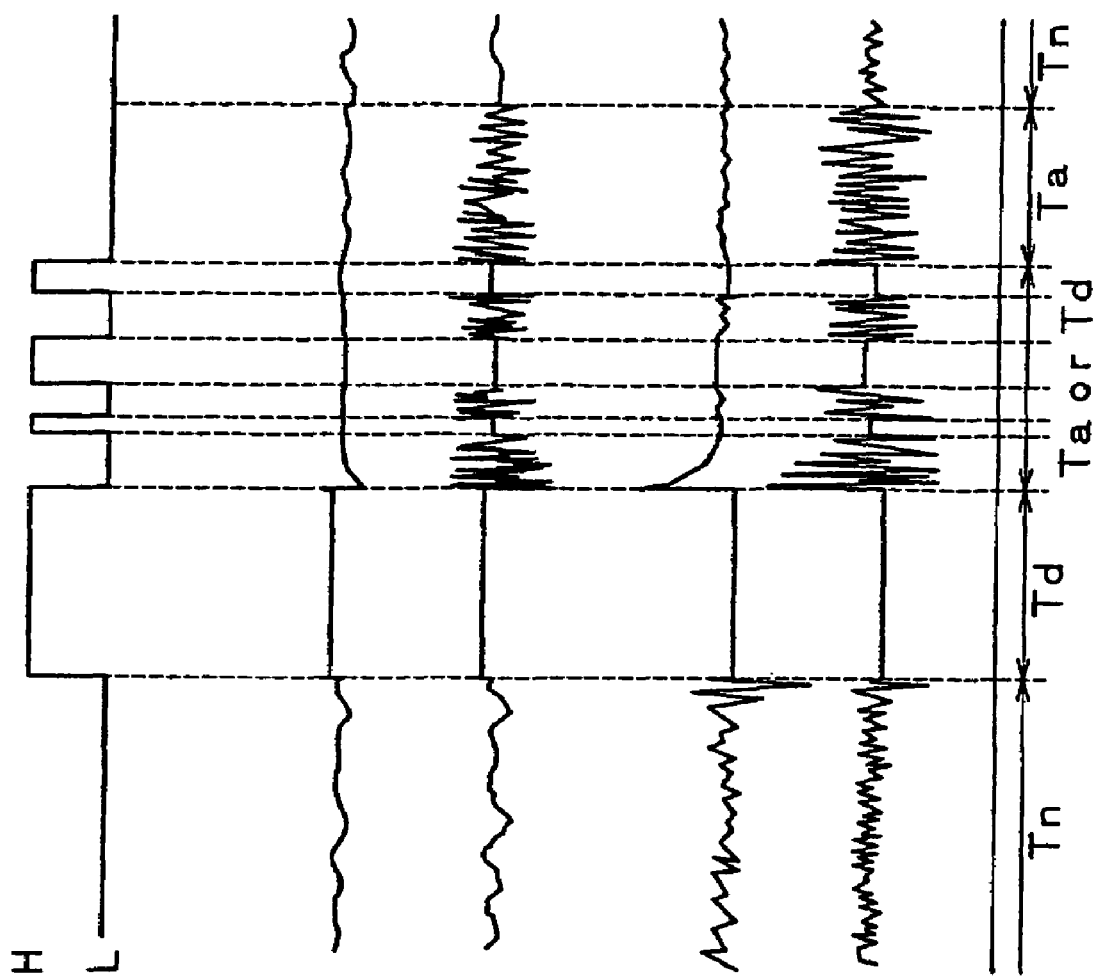
FIG. 8A DEFECT SIGNAL
FIG. 8B FE SIGNAL
FIG. 8C FOCUS DRIVE SIGNAL
FIG. 8D TE SIGNAL
FIG. 8E TRACKING DRIVE SIGNAL

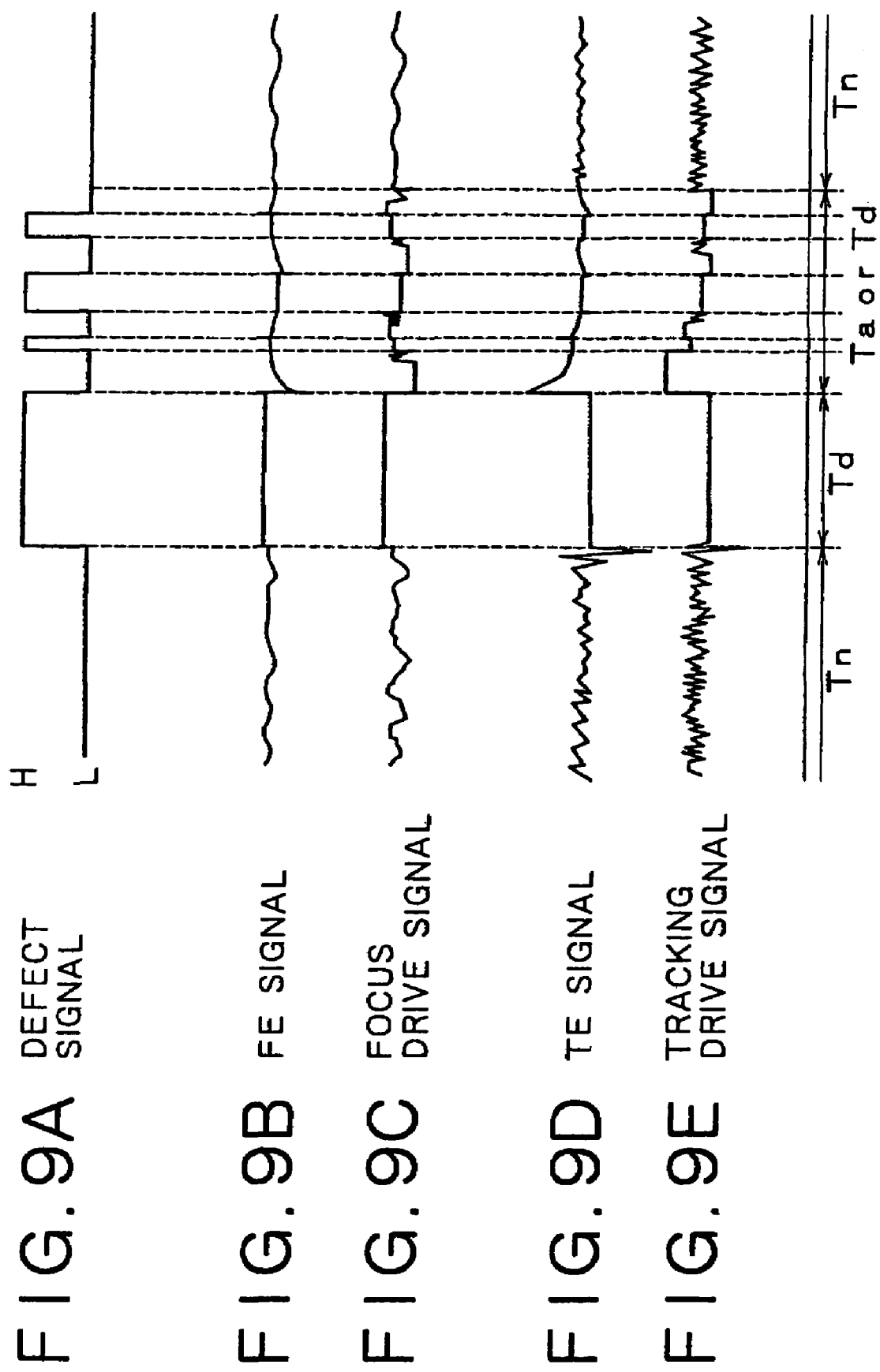

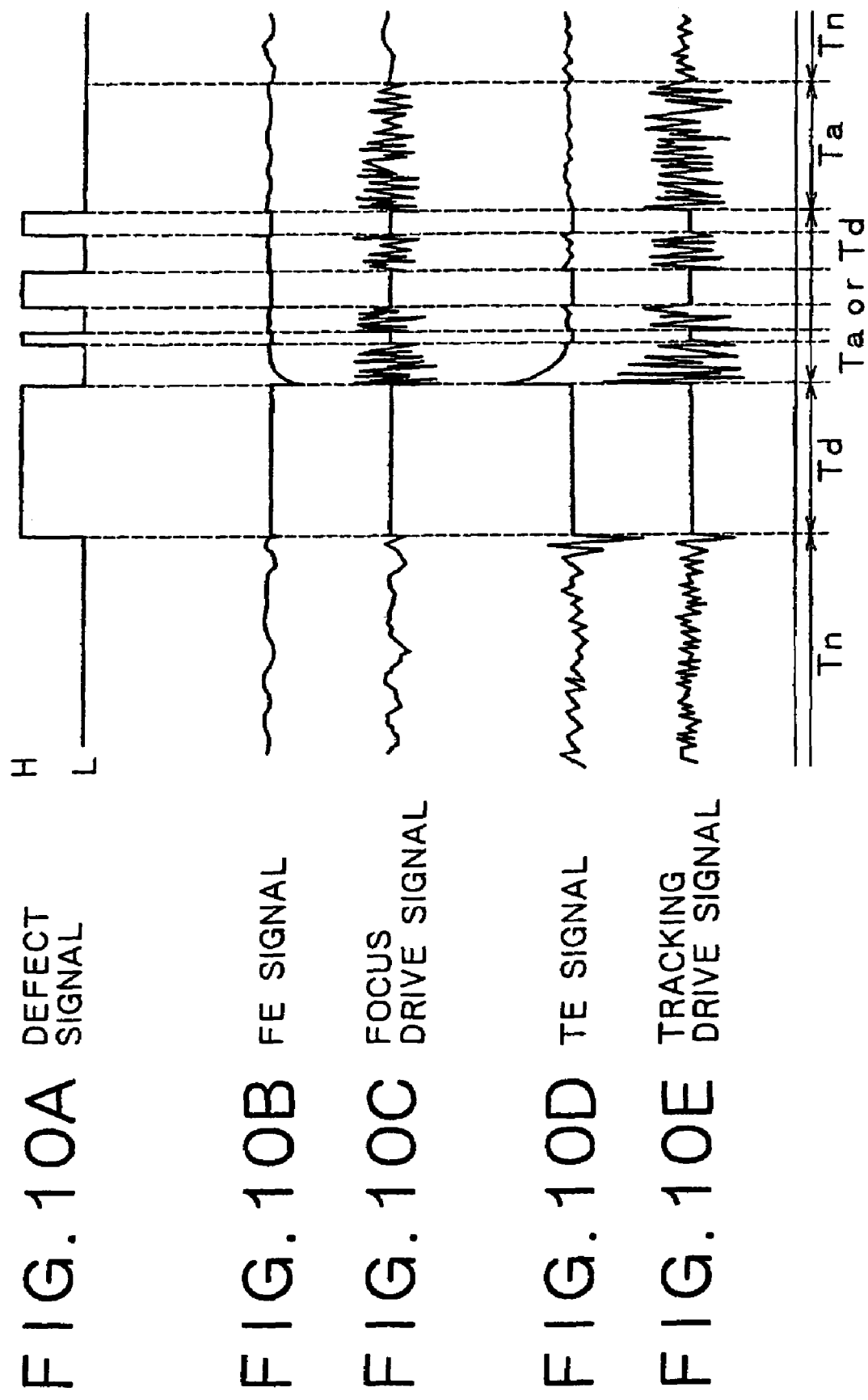

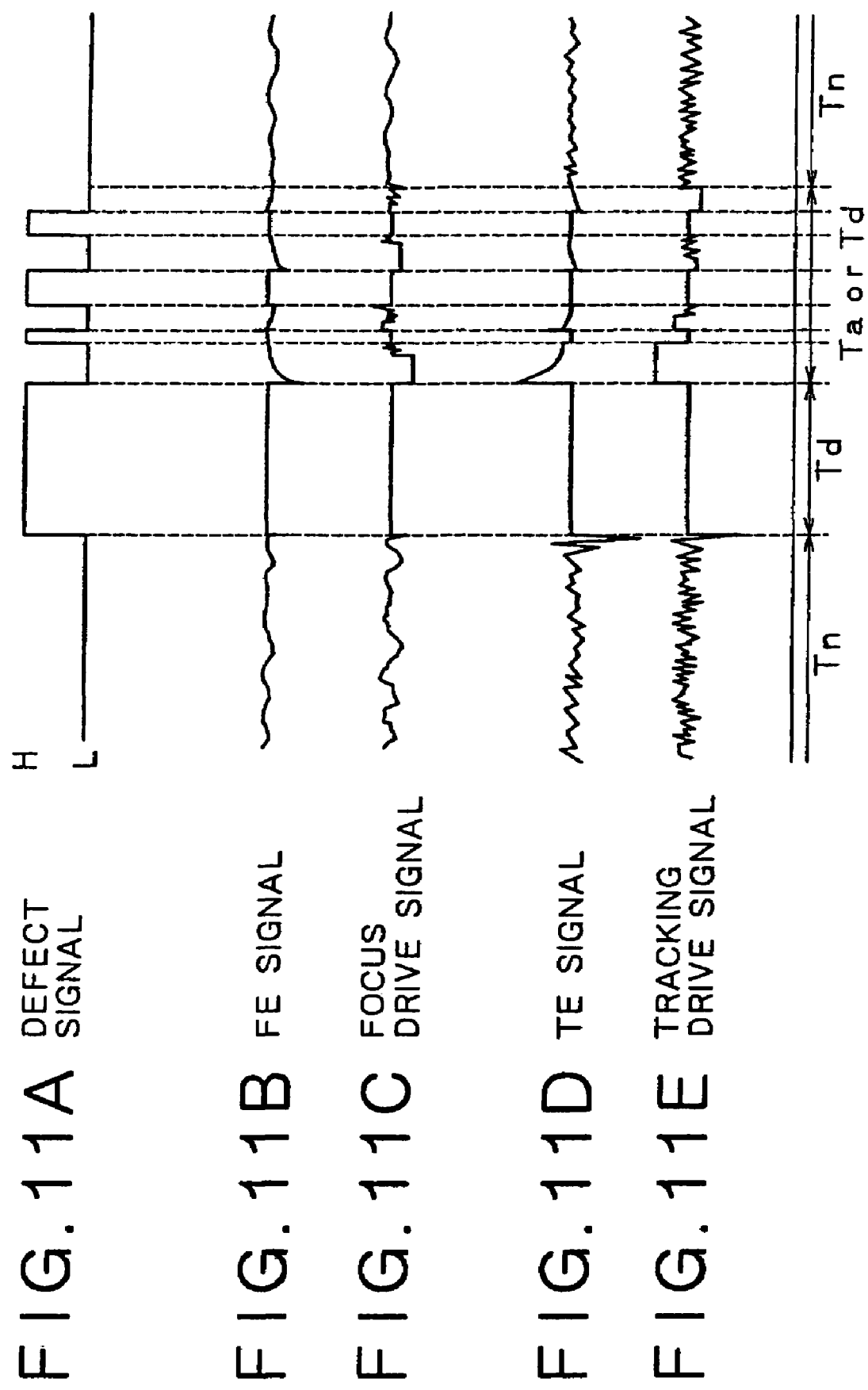

PLAYBACK APPARATUS, METHOD, AND RECORDING MEDIUM FOR DEFECT PERIOD PROCESSING AND POST-DEFECT PERIOD PROCESSING

BACKGROUND

The present invention relates to an apparatus and a method for playback and a recording medium, and particularly to an apparatus and a method for playback and a recording medium suitable for use in preventing a malfunction of a servo of an optical pickup resulting from a flaw or the like on a disk medium, for example.

FIG. 1 shows a configuration of a conventional optical disk playback apparatus for reproducing data recorded on an optical disk.

A spindle motor 2 in the conventional optical disk playback apparatus drives and rotates an optical disk 1. An optical pickup 3 irradiates the optical disk 1 with laser light, generates a signal corresponding to the reflected light, and then outputs the signal to an RF signal generating unit 4, an FE signal generating unit 5, and a TE signal generating unit 6. Also, the optical pickup 3 adjusts focus servo operation in response to a focus drive signal from a focus driver 10, and adjusts tracking servo operation in response to a tracking drive signal from a tracking driver 12.

The RF signal-generating unit 4 generates an RF signal on the basis of the signal from the optical pickup 3, and then outputs the RF signal to a binarizing unit 7 and a defect-detecting unit 8. The FE signal-generating unit 5 generates a focus error signal (hereinafter described as an FE signal) on the basis of the signal from the optical pickup 3, and then outputs the FE signal to a focus servo control unit 9. The TE signal generating unit 6 generates a tracking error signal (hereinafter described as a TE signal) on the basis of the signal from the optical pickup 3, and then outputs the TE signal to a tracking servo control unit 11.

The binarizing unit 7 generates a data signal by binarizing the RF signal from the RF signal-generating unit 4 into 0 or 1. The defect detecting unit 8 detects a loss of a signal (defect) resulting from a flaw, a stain or the like present on the optical disk 1 on the basis of the RF signal from the RF signal generating unit 4, generates a defect signal indicating a period of a defect detected, and then outputs the defect signal to the focus servo control unit 9 and the tracking servo control unit 11.

A method for detecting a defect is, for example, to set level of the defect signal during a period when level of the RF signal is lower than a predetermined threshold value as High, and to set the defect signal during a period when the level of the RF signal is higher than the predetermined threshold value as Low. Specifically, when the RF signal has a level as shown in FIG. 2A, the defect signal has a corresponding level as shown in FIG. 2B.

During a normal period (period when the level of the defect signal from the defect detecting unit 8 is Low), the focus servo control unit 9 generates a focus drive control signal corresponding to the FE signal from the FE signal generating unit 5, and then outputs the focus drive control signal to the focus driver 10. When the level of the defect signal is High, the focus servo control unit 9 holds level of the focus drive control signal at a predetermined reference value or a value of the focus drive control signal immediately before the level of the defect signal becomes High, as shown in FIG. 2D, and then outputs the level of the focus drive control signal to the focus driver 10.

The focus driver 10 generates a focus drive signal corresponding to the focus drive control signal from the focus servo control unit 9, and then outputs the focus drive signal to the optical pickup 3.

During a normal period (period when the level of the defect signal from the defect detecting unit 8 is Low), the tracking servo control unit 11 generates a tracking drive control signal on the basis of the TE signal from the TE signal generating unit 6, and then outputs the tracking drive control signal to the tracking driver 12. When the level of the defect signal is High, the tracking servo control unit 11 holds level of the tracking drive control signal at a predetermined reference value or a value of the tracking drive control signal immediately before the level of the defect signal becomes High, as shown in FIG. 2F, and then outputs the level of the tracking drive control signal to the tracking driver 12.

The tracking driver 12 generates a tracking drive signal corresponding to the tracking drive control signal from the tracking servo control unit 11, and then outputs the tracking drive signal to the optical pickup 3.

In some cases, the conventional optical disk playback apparatus supplies the defect signal generated by the defect-detecting unit 8 to the FE signal-generating unit 5 and the TE signal-generating unit 6.

In such cases, during a normal period (period when the level of the defect signal from the defect detecting unit 8 is Low), the FE signal generating unit 5 supplied with the defect signal generates the FE signal on the basis of the signal from the optical pickup 3, and then outputs the FE signal to the focus servo control unit 9. When the level of the defect signal is High, the FE signal generating unit 5 holds level of the FE signal at a predetermined reference value or a value of the FE signal immediately before the level of the defect signal becomes High, as shown in FIG. 2C, and then outputs the level of the FE signal to the focus servo control unit 9. The focus servo control unit 9 outputs a focus drive signal as shown in FIG. 2D corresponding to the FE signal whose level is being held constant.

During a normal period (period when the level of the defect signal from the defect detecting unit 8 is Low), the TE signal generating unit 6 supplied with the defect signal generates the TE signal on the basis of the signal from the optical pickup 3, and then outputs the TE signal to the tracking servo control unit 11. When the level of the defect signal is High, the TE signal generating unit 6 holds level of the TE signal at a predetermined reference value or a value of the TE signal immediately before the level of the defect signal becomes High, as shown in FIG. 2E, and then outputs the level of the TE signal to the tracking servo control unit 11. The tracking servo control unit 11 outputs a tracking drive signal as shown in FIG. 2F corresponding to the TE signal having a fixed value.

Thus, even if normal reflected light is not obtained because of the presence of a flaw or the like on the optical disk 1, the conventional optical disk playback apparatus thus formed holds the level of the focus drive signal and the tracking drive signal while the level of the defect signal is High. Therefore, a malfunction of a focus servo and a tracking servo of the optical pickup 3 is prevented.

However, in the case of a long High-level period of the defect signal or depending on an error in the output of the held focus drive signal and tracking drive signal, the optical pickup 3 is displaced substantially from an original servo control position when the level of the defect signal returns to Low.

Japanese Patent Laid-Open No. Sho 59-203276, for example, discloses a method for preventing such displacement which, directing attention to characteristics of the TE signal such as periodicity, generates a pseudo error signal approximating an original TE signal by calculation using a tracking error and a track period, and uses the calculated pseudo error signal instead of the original TE signal while the level of the defect signal is High.

Also, Japanese Patent Laid-Open No. Sho 64-39638 discloses a method which changes focus offset adjusting voltage to a predetermined value to thereby prevent displacement of a focus coil while the level of the defect signal is High, and thus minimizes the error when the level of the defect signal returns to Low.

The conventional techniques described above are all principally aimed to reduce a range of the control error while the level of the defect signal is High and after the level of the defect signal returns to Low, and give no consideration to reduction of a period from the return to Low of the level of the defect signal to the return to a normal control state of the servo.

In general, as the High-level period of the defect signal becomes longer, the control error tends to be increased. Hence, in case where the control error is large if not departing from a normal servo control range when the level of the defect signal returns to Low, for example, as shown in FIGS. 3A, 3B, 3C, 3D, and 3E, the servo continues to be unstable and requires considerable time before the servo returns to a normal control state.

In order to return the servo quickly to the normal control state, there is known a method which maintains a servo loop gain at a higher-than-normal level immediately after a track jump or the like. However, when the servo loop gain is high, the servo is generally too sensitive to a defect such as a flaw on the optical disk. Therefore, the method of increasing the servo loop gain cannot be used to improve defect passage characteristics.

SUMMARY

The present invention has been made in view of the above, and it is accordingly an object of the present invention to reduce time required for the servo to return to the normal control state after the level of the defect signal returns to Low.

According to the present invention, there is provided a playback apparatus comprising: RF signal generating means for generating an RF signal on the basis of an analog signal outputted by an optical pickup; data signal generating means for generating a data signal by binarizing the RF signal; defect signal generating means for generating a defect signal for indicating a defect on a disk medium on the basis of the RF signal; focus error signal generating means for generating a focus error signal on the basis of the analog signal outputted by the optical pickup; a focus servo control means for controlling a focus servo of the optical pickup in response to the focus error signal; tracking error signal generating means for generating a tracking error signal on the basis of the analog signal outputted by the optical pickup; tracking servo control means for controlling a tracking servo of the optical pickup in response to the tracking error signal; monitoring means for monitoring the defect signal and thereby detecting a start and an end of a defect period; defect period processing control means for controlling the focus servo control means and the tracking servo control means so that the focus servo control means and the tracking servo control means perform defect period processing when a result of the monitoring by the monitoring means indicates the defect period; and post-defect period processing control means for controlling the focus servo control means and the tracking servo control means so that the focus servo control means and the tracking servo control means perform post-defect period processing when a result of the monitoring by the monitoring means indicates the end of the defect period.

The defect period processing control means can control the focus servo control means and the tracking servo control means so that the focus error signal or the tracking error signal of the optical pickup is held at a predetermined value.

The post-defect period processing control means can control the focus servo control means and the tracking servo control means so that servo operation of the optical pickup is sped up.

When the monitoring means detects the start of the defect period during the post-defect period processing performed under control of the post-defect period processing control means, the post-defect period processing control means can stop the post-defect period processing, and the defect period processing control means can start the defect period processing.

According to the present invention, there is provided a playback method comprising: an RF signal generating step for generating an RF signal on the basis of an analog signal outputted by an optical pickup; a data signal generating step for generating a data signal by binarizing the RF signal; a defect signal generating step for generating a defect signal for indicating a defect on a disk medium on the basis of the RF signal; a focus error signal generating step for generating a focus error signal on the basis of the analog signal outputted by the optical pickup; a focus servo control step for controlling a focus servo of the optical pickup in response to the focus error signal; a tracking error signal generating step for generating a tracking error signal on the basis of the analog signal outputted by the optical pickup; a tracking servo control step for controlling a tracking servo of the optical pickup in response to the tracking error signal; a monitoring step for monitoring the defect signal and thereby detecting a start and an end of a defect period; a defect period processing control step for controlling processing of the focus servo control step and processing of the tracking servo control step so that defect period processing is performed when a result of the monitoring by processing of the monitoring step indicates the defect period; and a post-defect period processing control step for controlling the processing of the focus servo control step and the processing of the tracking servo control step so that post-defect period processing is performed when a result of the monitoring by the processing of the monitoring step indicates the end of the defect period.

According to the present invention, there is provided a program on a recording medium, comprising: an RF signal generating step for generating an RF signal on the basis of an analog signal outputted by an optical pickup; a data signal generating step for generating a data signal by binarizing the RF signal; a defect signal generating step for generating a defect signal for indicating a defect on a disk medium on the basis of the RF signal; a focus error signal generating step for generating a focus error signal on the basis of the analog signal outputted by the optical pickup; a focus servo control step for controlling a focus servo of the optical pickup in response to the focus error signal; a tracking error signal generating step for generating a tracking error signal on the basis of the analog signal outputted by the optical pickup; a tracking servo control step for controlling a tracking servo of the optical pickup in response to the tracking error signal; a monitoring step for monitoring the defect signal and thereby detecting a start and an end of a defect period; a defect period processing control step for controlling processing of the focus servo control step and processing of the tracking servo control step so that-defect period processing is performed when a result of the monitoring by processing of the monitoring step indicates the defect period; and a post-defect period processing control step for controlling the processing of the focus servo control step and the processing of the tracking servo control step so that post-defect period processing is performed when a result of the monitoring by the processing of the monitoring step indicates the end of the defect period.

The playback apparatus and method and the program on a recording medium according to the present invention generate an RF signal on the basis of an analog signal outputted by an optical pickup, generate a data signal by binarizing the RF signal, and generate a defect signal for indicating a defect on a disk medium on the basis of the RF signal. Also, the playback apparatus and method and the program on a recording medium according to the present invention generate a focus error signal on the basis of the analog signal outputted by the optical pickup, and control a focus servo of the optical pickup in response to the focus error signal. In addition, the playback apparatus and method and the program on a recording medium according to the present invention generate a tracking error signal on the basis of the analog signal outputted by the optical pickup, and control a tracking servo of the optical pickup in response to the tracking error signal. Furthermore, the playback apparatus and method and the program on a recording medium according to the present invention detect a start and an end of a defect period by monitoring the defect signal, perform defect period processing when a result of the monitoring indicates the defect period, and perform post-defect period processing when a result of the monitoring indicates the end of the defect period.

BRIEF DESCRIPTION OF THE DRAWINGS

FIGS. 6A, 6B, 6C, 6D, and 6E are diagrams of assistance in explaining defect handling processing by the optical disk playback apparatus;

FIGS. 7A, 7B, 7C, 7D, and 7E are diagrams of assistance in explaining defect handling processing by the optical disk playback apparatus;

FIGS. 8A, 8B, 8C, 8D, and 8E are diagrams of assistance in explaining defect handling processing by the optical disk playback apparatus;

FIGS. 9A, 9B, 9C, 9D, and 9E are diagrams of assistance in explaining defect handling processing by the optical disk playback apparatus;

FIGS. 10A, 10B, 10C, 10D, and 10E are diagrams of assistance in explaining defect handling processing by the optical disk playback apparatus; and FIGS. 11A, 11B, 11C, 11D, and 11E are diagrams of assistance in explaining defect handling processing by the optical disk playback apparatus.

DETAILED DESCRIPTION

Figure 1:
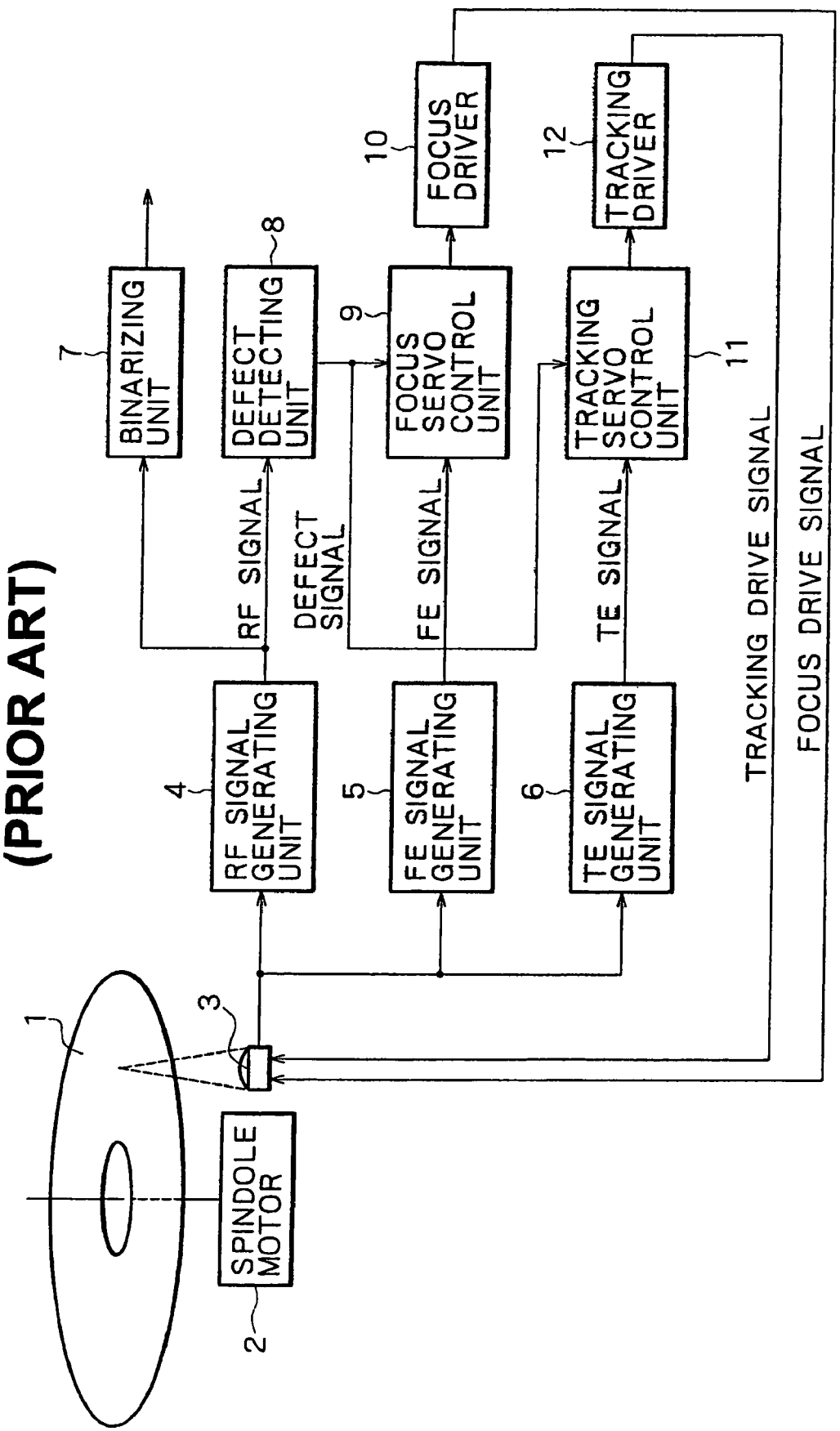
FIG. 1 is a block diagram showing a configuration of a conventional optical disk playback apparatus.
Figure 2:
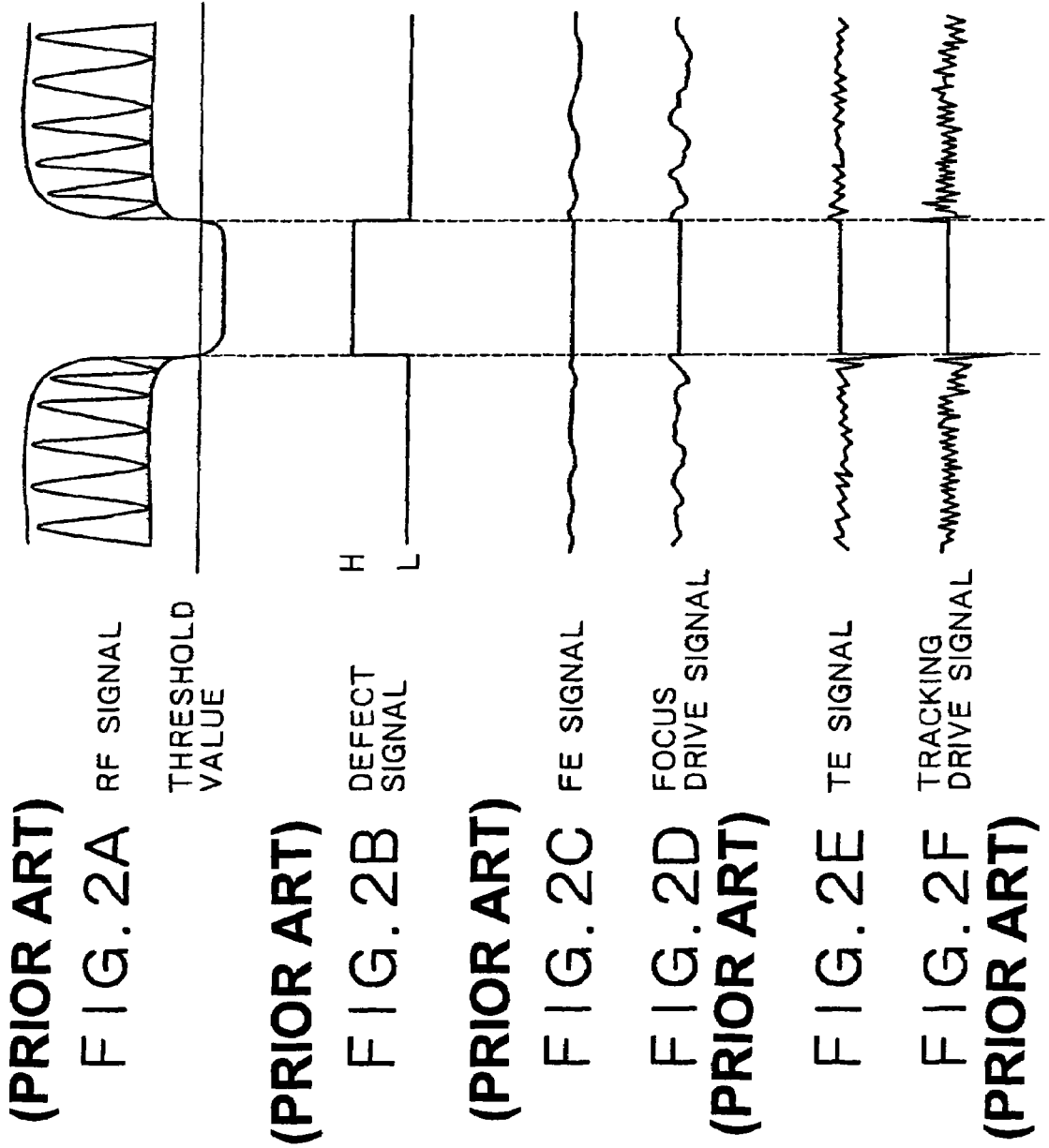
FIGS. 2A, 2B, 2C, 2D, 2E, and 2F are diagrams of assistance in explaining conventional processing for handling a defect.
Figure 3:
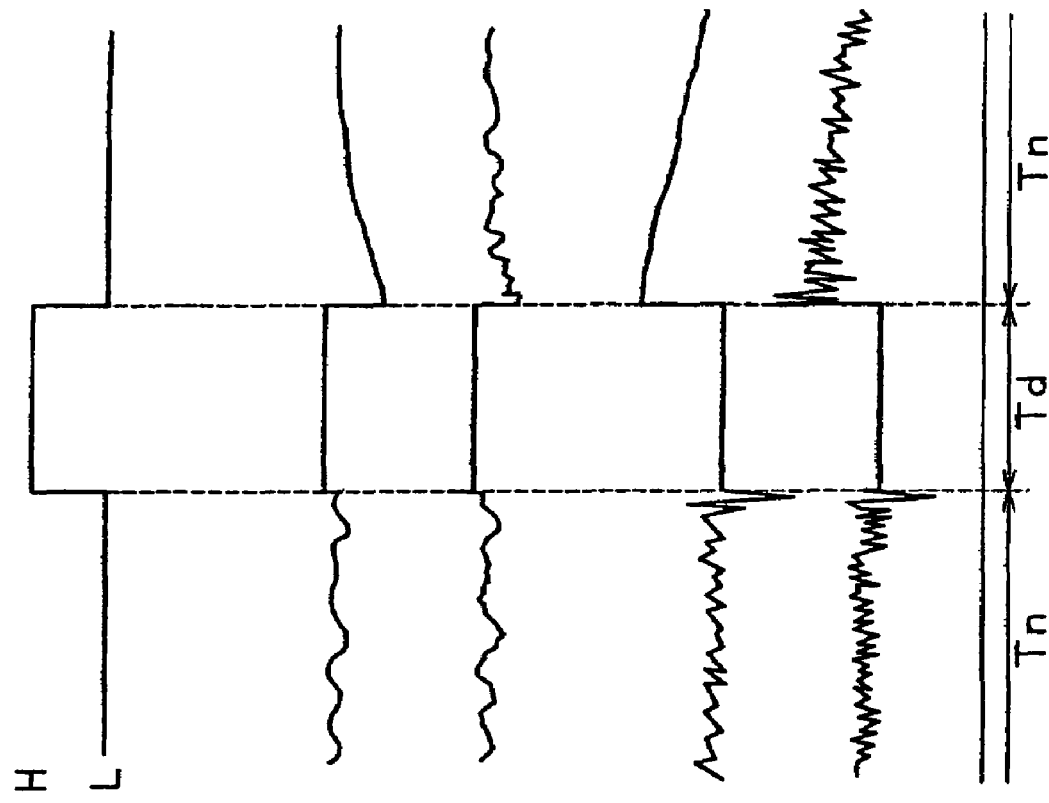
FIGS. 3A, 3B, 3C, 3D, and 3E are diagrams of assistance in explaining conventional processing for handling a defect.

An example of configuration of an optical disk playback apparatus to which the present invention is applied will be described with reference to FIG. 4.

A spindle motor 22 forming the optical disk playback apparatus 20 drives and rotates an optical disk 21. An optical pickup 23 irradiates the optical disk 21 with laser light, generates a signal corresponding to the reflected light, and then outputs the signal to an RF signal generating unit 24, an FE signal generating unit 25, and a TE signal generating unit 26. Also, the optical pickup 23 adjusts focus servo operation in response to a focus drive signal from a focus driver 39, and adjusts tracking servo operation in response to a tracking drive signal from a tracking driver 46.

The RF signal-generating unit 24 generates an RF signal corresponding to the signal from the optical pickup 23, and then outputs the RF signal to a binarizing unit 27 and a defect processing control unit 28. The FE signal-generating unit 25 generates an FE signal on the basis of the signal from the optical pickup 23, and then outputs the FE signal to a focus servo control unit 33. The TE signal-generating unit 26 generates a TE signal on the basis of the signal from the optical pickup 23, and then outputs the TE signal to a tracking servo control unit 40.

The binarizing unit 27 converts the RF signal from the RF signal-generating unit 24 into digital data of 0 or 1, thus generating a data signal.

A defect detecting unit 29 forming the defect processing control unit 28 detects a loss of a signal (defect) resulting from a flaw, a stain or the like present on the optical disk 21 on the basis of a result of comparison between level of the RF signal from the RF signal generating unit 24 and a predetermined threshold value, for example. The defect-detecting unit 29 generates a defect signal that has a Low level during a normal period (not a period of a defect) and has a High level during a defect period. The defect-detecting unit 29 outputs the defect signal to a defect period monitoring unit 30.

The defect period monitoring unit 30 monitors the defect signal from the defect-detecting unit 29. During a period in which the defect signal has a High level, the defect period monitoring unit 30 generates a defect period signal indicating the High level of the defect signal, and then outputs the defect period signal to a defect period processing control unit 31. When the level of the defect signal has returned from High to Low, the defect period monitoring unit 30 generates a defect period end signal indicating that the level of the defect signal has returned from High to Low, and then outputs the defect period end signal to a post-defect period processing control unit 32.

In response to the defect period signal from the defect period monitoring unit 30, the defect period processing control unit 31 controls a pre-stage switch 34 and an FE signal previous value hold unit 37 of the focus servo control unit 33, as well as a pre-stage switch 41 and a TE signal previous value hold unit 44 of the tracking servo control unit 40.

In response to the defect period end signal from the defect period monitoring unit 30, the post-defect period processing control unit 32 controls a post-stage switch 36 of the focus servo control unit 33, as well as a post-stage switch 43 of the tracking servo control unit 40.

In the focus servo control unit 33, the FE signal from the FE signal generating unit 25 is supplied to the pre-stage switch 34, the FE signal previous value hold unit 37, and a post-defect servo control unit 38.

The pre-stage switch 34 performs switching under control of the defect period processing control unit 31. When the pre-stage switch 34 is turned to a terminal (a) side, the FE signal from the FE signal generating unit 25 is outputted to a normal servo loop filter unit 35. On the other hand, when the pre-stage switch 34 is turned to a terminal (b) side, an FE signal held by the FE signal previous value hold unit 37 is outputted to the normal servo loop filter unit 35. Normally, the pre-stage switch 34 is turned to the terminal (a) side.

The normal servo loop filter unit 35 generates a focus drive control signal by subjecting the FE signal inputted thereto via the pre-stage switch 34 to low-frequency boost processing, phase compensation processing, low-pass filter processing and the like. The normal servo loop filter unit 35 then outputs the focus drive control signal to a terminal (b) side of the post-stage switch 36.

The post-stage switch 36 performs switching under control of the post-defect period processing control unit 32. When the post-stage switch 36 is turned to a terminal (a) side, a focus drive control signal from the post-defect servo control unit 38 is outputted to the focus driver 39. On the other hand, when the post-stage switch 36 is turned to a terminal (b) side, the focus drive control signal from the normal servo loop filter unit 35 is outputted to the focus driver 39. Normally, the post-stage switch 36 is turned to the terminal (b) side.

Under control of the defect period processing control unit 31, the FE signal previous value hold unit 37 holds the level of the FE signal from the FE signal generating unit 25, and then outputs the level of the FE signal to the terminal (b) side of the pre-stage switch 34.

The post-defect servo control unit 38 generates a focus drive control signal by subjecting the FE signal from the FE signal generating unit 25 to gain increase processing in addition to the processing of the normal servo loop filter unit 35. The post-defect servo control unit 38 then outputs the focus drive control signal to the terminal (a) side of the post-stage switch 36.

The focus driver 39 generates a focus drive signal on the basis of the focus drive control signal from the post-stage switch 36, and then outputs the focus drive signal to the optical pickup 23.

In the tracking servo control unit 40, the TE signal from the TE signal generating unit 26 is supplied to the pre-stage switch 41, the TE signal previous value hold unit 44, and a post-defect servo control unit 45.

The pre-stage switch 41 performs switching under control of the defect period processing control unit 31. When the pre-stage switch 41 is turned to a terminal (a) side, the TE signal from the TE signal generating unit 26 is outputted to a normal servo loop filter unit 42. On the other hand, when the pre-stage switch 41 is turned to a terminal (b) side, a TE signal held by the TE signal previous value hold unit 44 is outputted to the normal servo loop filter unit 42. Normally, the pre-stage switch 41 is turned to the terminal (a) side.

The normal servo loop filter unit 42 generates a tracking drive control signal by subjecting the TE signal inputted thereto via the pre-stage switch 41 to low-frequency boost processing, phase compensation processing, low-pass filter processing and the like. The normal servo loop filter unit 42 then outputs the tracking drive control signal to a terminal (b) side of the post-stage switch 43.

The post-stage switch 43 performs switching under control of the post-defect period processing control unit 32. When the post-stage switch 43 is turned to a terminal (a) side, a tracking drive control signal from the post-defect servo control unit 45 is outputted to the tracking driver 46. On the other hand, when the post-stage switch 43 is turned to a terminal (b) side, the tracking drive control signal from the normal servo loop filter unit 42 is outputted to the tracking driver 46. Normally, the post-stage switch 43 is turned to the terminal (b) side.

Under control of the defect period processing control unit 31, the TE signal previous value hold unit 44 holds the level of the TE signal from the TE signal generating unit 26, and then outputs the level of the TE signal to the terminal (b) side of the pre-stage switch 41.

The post-defect servo control unit 45 generates a tracking drive control signal by subjecting the TE signal from the TE signal-generating unit 26 to gain increase processing in addition to the processing of the normal servo loop filter unit 42. The post-defect servo control unit 45 then outputs the tracking drive control signal to the terminal (a) side of the post-stage switch 43.

The tracking driver 46 generates a tracking drive signal on the basis of the tracking drive control signal from the post-stage switch 43, and then outputs the tracking drive signal to the optical pickup 23.

A control unit 50 controls a drive 51 to read a control program stored on a magnetic disk 52, an optical disk 53, a magneto-optical disk 54, or a semiconductor memory 55, and then controls the whole of the optical disk playback apparatus 20 on the basis of the read control program.

Defect handling processing by the optical disk playback apparatus 20 will next be described with reference to a flowchart of FIG. 5 and FIGS. 6A, 6B, 6C, 6D, and 6E. The defect handling processing is intended to handle a loss of a signal (defect) resulting from a flaw, a stain or the like present on the optical disk 21, and is started simultaneously with a start of processing of reproducing data from the optical disk 21.

At a step S1, the defect period processing control unit 31 of the defect processing control unit 28 effects control to turn the pre-stage switch 34 of the focus servo control unit 33 and the pre-stage switch 41 of the tracking servo control unit 40 to the terminal (a) side, which is a normal position.

At a step S2, the defect period monitoring unit 30 of the defect processing control unit 28 monitors the defect signal from the defect detecting unit 29 and stands by until the defect period monitoring unit 30 detects the start of a defect period, that is, the defect period monitoring unit 30 detects a change in the level of the defect signal from Low to High, as shown in FIG. 6A. When the defect period monitoring unit 30 detects the start of a defect period (Td in FIG. 6A), the processing proceeds to a step S3.

At the step S3, the defect period monitoring unit 30 generates a defect period signal, and then outputs the defect period signal to the defect period processing control unit 31. In response to the defect period signal from the defect period monitoring unit 30, the defect period processing control unit 31 controls the pre-stage switch 34 and the FE signal previous value hold unit 37 of the focus servo control unit 33, as well as the pre-stage switch 41 and the TE signal previous value hold unit 44 of the tracking servo control unit 40, as processing during a defect period.

Under control of the defect period processing control unit 31, the FE signal previous value hold unit 37 holds the level of an FE signal inputted from the FE signal generating unit 25 immediately before the defect period Td, as shown in FIG. 6B, and then outputs the level of the FE signal to the terminal (b) side of the pre-stage switch 34. The TE signal previous value hold unit 44 holds the level of a TE signal inputted from the TE signal generating unit 26 immediately before the defect period Td, as shown in FIG. 6D, and then outputs the level of the TE signal to the terminal (b) side of the pre-stage switch 41. The pre-stage switches 34 and 41 are turned to the terminal (b) side.

At a step S4, the defect period monitoring unit 30 monitors the defect signal from the defect detecting unit 29 and stands by until the defect period monitoring unit 30 detects the end of the defect period, that is, the defect period monitoring unit 30 detects a change in the level of the defect signal from High to Low, as shown in FIG. 6A.

Thus, during the defect period Td, the FE signal held by the FE signal previous value hold unit 37 is supplied to the normal servo loop filter unit 35, while the TE signal held by the TE signal previous value hold unit 44 is supplied to the normal servo loop filter unit 42.

Hence, during the defect period Td, the focus drive control signal generated by the normal servo loop filter unit 35 on the basis of the FE signal is also held constant, and accordingly the focus drive signal generated by the focus driver 39 on the basis of the focus drive control signal is also held constant, as shown in FIG. 6C. In addition, the tracking drive control signal generated by the normal servo loop filter unit 42 on the basis of the TE signal is also held constant, and accordingly the tracking drive signal generated by the tracking driver 46 on the basis of the tracking drive control signal is also held constant, as shown in FIG. 6E.

Thus, during the defect period Td, a focus coil and a tracking coil within the optical pickup 23 are held at a position immediately before the defect period Td.

When the defect period monitoring unit 30 detects the end of the defect period (Td in the figure) at the step S4, the processing proceeds to a step S5.

At the step S5, the defect period monitoring unit 30 generates a defect period end signal and then outputs the defect period end signal to the post-defect period processing control unit 32. In response to the defect period end signal from the defect period monitoring unit 30, the post-defect period processing control unit 32 controls the post-stage switch 36 of the focus servo control unit 33, as well as the post-stage switch 43 of the tracking servo control unit 40, as processing after the defect period. Ta in FIGS. 6A, 6B, 6C, 6D, and 6E denotes a period during which the post-defect period processing is performed.

Under control of the post-defect period processing control unit 32, the post-stage switches 36 and 43 are turned to the terminal (a) side. Thus, immediately after the defect period Td, a focus drive control signal with an increased servo gain from the post-defect servo control unit 38 is supplied to the focus driver 39, while a tracking drive control signal with an increased servo gain from the post-defect servo control unit 45 is supplied to the tracking driver 46.

At a step S6, the defect period monitoring unit 30 determines whether the defect signal is brought into a defect state again. When the defect period monitoring unit 30 determines that the defect signal is brought into a defect state again, the post-defect period processing is stopped immediately, and the processing returns to the step S3 to repeat the processes from the step S3 on down. When the defect period monitoring unit 30 determines at the step S6 that the defect signal is not brought into a defect state again, the processing proceeds to a step S7.

At the step S7, whether the post-defect period processing is to be ended or not is determined on the basis of whether a predetermined condition (to be described later) is satisfied. The processing at the steps S6 and S7 is repeated until it is determined that the post-defect period processing is to be ended. When it is determined at the step S7 that the post-defect period processing is to be ended, the post-stage switches 36 and 43 are turned to the terminal (b) side. Then, the processing returns to the step S2 to repeat the processes from the step S2 on down.

The conditions for turning the post-stage switches 36 and 43 to the terminal (b) side, that is, the conditions for timing of ending the period Ta are: passage of a predetermined time after turning the post-stage switches 36 and 43 to the terminal (a) side; the passing of a reference level by the FE signal and the TE signal; and reoccurrence of a defect state. The post-stage switches 36 and 43 are turned to the terminal (b) side when one of the conditions is satisfied.

As described above, according to the defect handling processing by the optical disk playback apparatus 20, the post-defect period processing, in which an action for correcting servo displacement is produced more strongly than during a normal period (a period of no defect), is started immediately after detection of the end of the defect period Td. Therefore, servo displacement can be corrected quickly as compared with a case (FIGS. 3A, 3B, 3C, 3D, and 3E) where the post-defect period processing is not performed.

Incidentally, the turning of the pre-stage switches 34 and 41 while the post-defect period processing is performed at the step S5 is not determined uniquely because the turning of the pre-stage switches 34 and 41 is changed depending on the method of the post-defect period processing and a situation in which a defect state occurs again.

The above-described operation of the post-defect servo control unit 38 of the focus servo control unit 33 and the post-defect servo control unit 45 of the tracking servo control unit 40 will hereinafter be described as first operation.

The post-defect servo control unit 38 of the focus servo control unit 33 may detect a difference between the level of the FE signal immediately after the end of the defect period and a reference level and output a pulse voltage acting to reduce the difference to the terminal (a) of the post-stage switch 36 as a focus drive control signal.

Similarly, the post-defect servo control unit 45 of the tracking servo control unit 40 may detect a difference between the level of the TE signal immediately after the end of the defect period and a reference level and output a pulse voltage acting to reduce the difference to the terminal (a) of the post-stage switch 43 as a tracking drive control signal. Such operation of the post-defect servo control units 38 and 45 will hereinafter be described as second operation.

When the post-defect servo control units 38 and 45 perform the second operation, the condition for timing of returning the post-stage switches 36 and 43 to the terminal (b) side, that is, the condition for timing of ending the period Ta for performing the post-defect period processing is the passing of a reference level by the FE signal and the TE signal.

FIGS. 7A, 7B, 7C, 7D, and 7E show a result of defect handling processing when the post-defect servo control units 38 and 45 perform the second operation.

FIGS. 8A, 8B, 8C, 8D, and 8E show a result of processing when a relatively short defect occurs three times during the performance of the post-defect period processing in which the post-defect servo control units 38 and 45 perform the first operation.

FIGS. 9A, 9B, 9C, 9D, and 9E show a result of processing when a relatively short defect occurs three times during the performance of the post-defect period processing in which the post-defect servo control units 38 and 45 perform the second operation.

Since the servo is in a more unstable state during the post-defect period processing than during normal operation, the level of the focus drive signal and the tracking drive signal held immediately after reoccurrence of a defect state may not necessarily be appropriate.

Therefore, when a defect state occurs, output voltage of the focus drive signal and the tracking drive signal may be fixed at a reference level (for example zero potential) so that voltage is not applied to the focus coil and the tracking coil.

In such a case, by resetting the length of the period Ta to an initial value, it is possible to prevent the post-defect period processing from being ended within less than a specified time. It is also possible to deal with a case where a defect state continually occurs in a short time.

FIGS. 10A, 10B, 10C, 10D, and 10E show a result of processing where the output voltage of the focus drive signal and the tracking drive signal is set to be fixed at a reference level when a defect state occurs, and a relatively short defect occurs three times during the performance of the post-defect period processing in which the post-defect servo control units 38 and 45 perform the first operation.

FIGS. 11A, 11B, 11C, 11D, and 11E show a result of processing where the output voltage of the focus drive signal and the tracking drive signal is set to be fixed at a reference level when a defect state occurs, and a relatively short defect occurs three times during the performance of the post-defect period processing in which the post-defect servo control units 38 and 45 perform the second operation.

As described above, the optical disk playback apparatus 20 to which the present invention is applied monitors reoccurrence of a defect, and when a defect occurs, the optical disk playback apparatus 20 stops the post-defect period processing to perform defect processing again. Therefore, it is possible to solve the problem of the servo becoming too sensitive to a defect such as a flaw when the loop gain of the servo is increased, and it is thereby possible to make the servo less affected by a defect even when the servo loop gain is high.

It is to be noted that the present invention can be applied not only to playback apparatus such as the present embodiment for playing back an optical disk such as a CD (Compact Disc) but also to playback apparatus for playing back a DVD (Digital Versatile Disc), an MD (Mini Disc), a magneto-optical disk and the like.

The series of processing steps described above may be carried out not only by hardware but also by software. When the series of processing steps is to be carried out by software, a program is installed from a recording medium onto a computer where programs forming the software are incorporated in dedicated hardware, or a general-purpose personal computer that can perform various functions by installing various programs thereon, for example.

Figure 4:
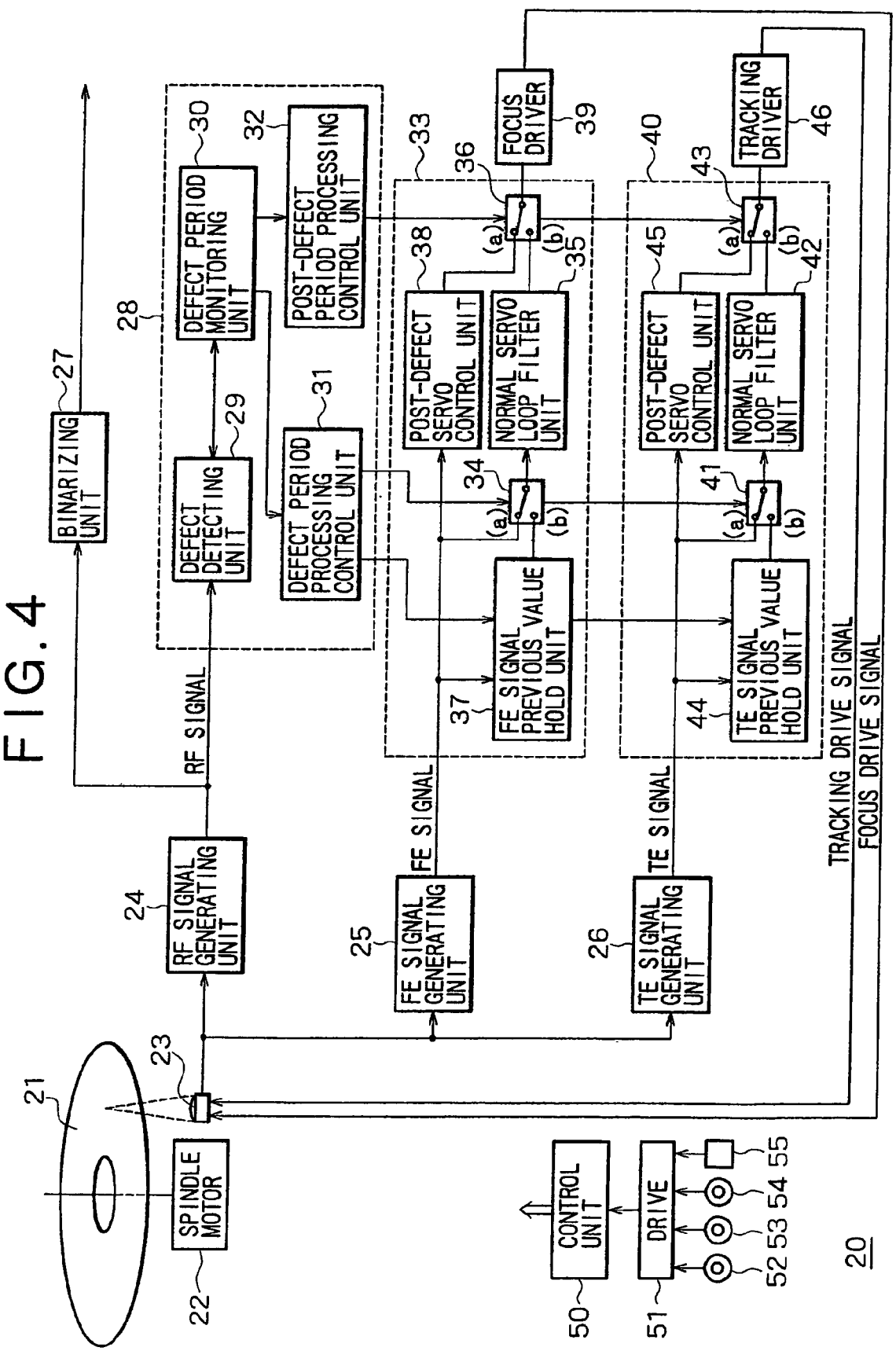
FIG. 4 is a block diagram showing a configuration of an optical disk playback apparatus according to an embodiment of the present invention.
Figure 5:
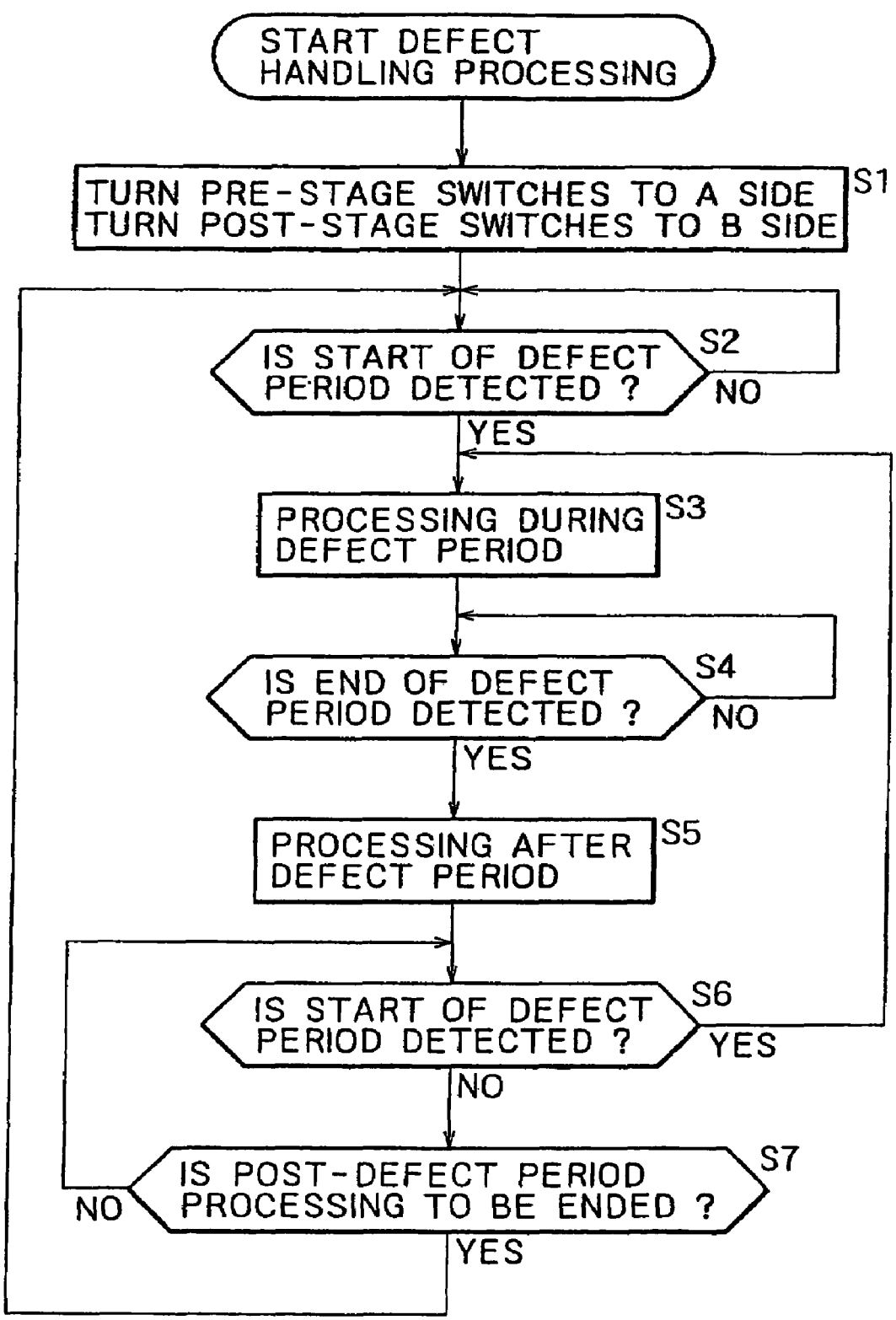
FIG. 5 is a flowchart of assistance in explaining defect handling processing by the optical disk playback apparatus.

Examples of the recording medium include not only program-recorded package media distributed to users to provide the program separately from computers, such as the magnetic disks 52 (including a floppy disk), the optical disks 53 (including CD-ROM (Compact Disk-Read Only Memory) and DVD (Digital Versatile Disk)), the magneto-optical disks 54 (including MD (Mini Disk)), or the semiconductor memories 55, as shown in FIG. 4, but also a ROM and a hard disk storing the program and supplied to a user in a state of being pre-incorporated in a computer.

It is to be noted that in the present specification, the steps describing the program recorded on a recording medium include not only processing steps carried out in time series in the described order but also processing steps carried out in parallel or individually and not necessarily in time series.

As described above, the playback apparatus and method and the program on a recording medium according to the present invention detect the start and the end of a defect period by monitoring a defect signal, perform defect period processing when a result of the monitoring indicates a defect period, and perform post-defect period processing when a result of the monitoring indicates the end of the defect period. Therefore, it is possible to reduce time required for the servo of an optical pickup to return to a normal control state after the end of a defect period.

What is claimed is:

1. A playback apparatus for reproducing data recorded on a disk medium by using an optical pickup, said playback apparatus comprising:

RF signal generating means for generating an RF signal on the basis of an analog signal outputted by said optical pickup;

data signal generating means for generating a data signal by binarizing said RF signal;

defect signal generating means for generating a defect signal for indicating a defect on said disk medium on the basis of said RF signal;

focus error signal generating means for generating a focus error signal on the basis of said analog signal outputted by said optical pickup;

focus servo control means for controlling a focus servo of said optical pickup in response to said focus error signal;

tracking error signal generating means for generating a tracking error signal on the basis of said analog signal outputted by said optical pickup;

tracking servo control means for controlling a tracking servo of said optical pickup in response to said tracking error signal;

monitoring means for monitoring said defect signal and thereby detecting a start and an end of a defect period;

defect period processing control means for controlling said focus servo control means and said tracking servo control means so that said focus servo control means and said tracking servo control means perform defect period processing when a result of the monitoring by said monitoring means indicates said defect period, wherein the defect period processing includes controlling said focus servo control means and said tracking servo control means so that at least one of said focus error signal and said tracking error signal of said optical pickup is held at a previous value; and post-defect period processing control means for controlling said focus servo control means and said tracking servo control means so that said focus servo control means and said tracking servo control means perform post-defect period processing when a result of the monitoring by said monitoring means indicates the end of said defect period, wherein the post-defect period processing includes controlling said focus servo control means and said tracking servo control means so that at least one of said focus servo and said tracking servo of said optical pickup is driven with an increased servo gain, wherein the post-defect period processing is ended and defect processing begins again when passage of a predetermined time after turning post-stage switches to the terminal side, wherein the post-defect period processing is ended and defect processing begins again with the passing of a reference level by the focus error signal and the tracking error signal, and wherein the post-defect period processing is ended and defect processing begins again with a reoccurrence of a defect state.

2. A playback method for a playback apparatus, said playback apparatus reproducing data recorded on a disk medium by using an optical pickup, said playback method comprising:

an RF signal generating step for generating an RF signal on the basis of an analog signal outputted by said optical pickup;

a data signal generating step for generating a data signal by binarizing said RF signal;

a defect signal generating step for generating a defect signal for indicating a defect on said disk medium on the basis of said RF signal;

a focus error signal generating step for generating a focus error signal on the basis of said analog signal outputted by said optical pickup;

a focus servo control step for controlling a focus servo of said optical pickup in response to said focus error signal;

a tracking error signal generating step for generating a tracking error signal on the basis of said analog signal outputted by said optical pickup;

a tracking servo control step for controlling a tracking servo of said optical pickup in response to said tracking error signal;

a monitoring step for monitoring said defect signal and thereby detecting a start and an end of a defect period;

a defect period processing control step for controlling processing of said focus servo control step and processing of said tracking servo control step so that defect period processing is performed when a result of the monitoring by processing of said monitoring step indicates said defect period, wherein the defect period processing includes controlling said focus servo control step and said tracking servo control step so that at least one of said focus error signal and said tracking error signal of said optical pickup is held at a previous value; and a post-defect period processing control step for controlling the processing of said focus servo control step and the processing of said tracking servo control step so that post-defect period processing is performed when a result of the monitoring by the processing of said monitoring step indicates the end of said defect period, wherein the post-defect period processing includes controlling said focus servo control step and said tracking servo control step so that at least one of said focus servo and said tracking servo of said optical pickup is driven with an increased servo gain, wherein the post-defect period processing is ended and defect processing begins again when passage of a predetermined time after turning post-stage switches to the terminal side, wherein the post-defect period processing is ended and defect processing begins again with the passing of a reference level by the focus error signal and the tracking error signal, wherein the post-defect period processing is ended and defect processing begins again with a reoccurrence of a defect state.

3. A computer readable medium encoded with a computer program that is executed by a computer for reproducing data recorded on a disk medium by using an optical pickup, said program comprising:

an RF signal generating step for generating an RF signal on the basis of an analog signal outputted by said optical pickup;

a data signal generating step for generating a data signal by binarizing said RF signal;

a defect signal generating step for generating a defect signal for indicating a defect on said disk medium on the basis of said RF signal;

a focus error signal generating step for generating a focus error signal on the basis of said analog signal outputted by said optical pickup;

a focus servo control step for controlling a focus servo of said optical pickup in response to said focus error signal;

a tracking error signal generating step for generating a tracking error signal on the basis of said analog signal outputted by said optical pickup;

a tracking servo control step for controlling a tracking servo of said optical pickup in response to said tracking error signal;

a monitoring step for monitoring said defect signal and thereby detecting a start and an end of a defect period;

a defect period processing control step for controlling processing of said focus servo control step and processing of said tracking servo control step so that defect period processing is performed when a result of the monitoring by processing of said monitoring step indicates said defect period, wherein the defect period processing includes controlling said focus servo control step and said tracking servo control step so that at least one of said focus error signal and said tracking error signal of said optical pickup is held at a previous value; and a post-defect period processing control step for controlling the processing of said focus servo control step and the processing of said tracking servo control step so that post-defect period processing is performed when a result of the monitoring by the processing of said monitoring step indicates the end of said defect period, wherein the post-defect period processing includes controlling said focus servo control step and said tracking servo control step so that at least one of said focus servo and said tracking servo of said optical pickup is driven with an increased servo gain, wherein the post-defect period processing is ended and defect processing begins again when passage of a predetermined time after turning post-stage switches to the terminal side, wherein the post-defect period processing is ended and defect processing begins again with the passing of a reference level by the focus error signal and the tracking error signals and wherein the post-defect period processing is ended and defect processing begins again with a reoccurrence of a defect state.

4. A playback apparatus for reproducing data recorded on a disk medium by using an optical pickup, said playback apparatus comprising:

RF signal generating means for generating an RF signal on the basis of an analog signal outputted by said optical pickup;

data signal generating means for generating a data signal by binarizing said RF signal;

defect signal generating means for generating a defect signal for indicating a defect on said disk medium on the basis of said RF signal;

focus error signal generating means for generating a focus error signal on the basis of said analog signal outputted by said optical pickup;

focus servo control means for controlling a focus servo of said optical pickup in response to said focus error signal;

tracking error signal generating means for generating a tracking error signal on the basis of said analog signal outputted by said optical pickup;

tracking servo control means for controlling a tracking servo of said optical pickup in response to said tracking error signal;

monitoring means for monitoring said defect signal and thereby detecting a start and an end of a defect period;

defect period processing control means for controlling said focus servo control means and said tracking servo control means so that said focus servo control means and said tracking servo control means perform defect period processing when a result of the monitoring by said monitoring means indicates said defect period, wherein the defect period processing includes controlling said focus servo control means and said tracking servo control means so that at least one of said focus servo and said tracking servo is not energized; and post-defect period processing control means for controlling said focus servo control means and said tracking servo control means so that said focus servo control means and said tracking servo control means perform post-defect period processing when a result of the monitoring by said monitoring means indicates the end of said defect period, wherein the post-defect period processing is ended and defect processing begins again when passage of a predetermined time after turning post-stage switches to the terminal side, wherein the post-defect period processing is ended and defect processing begins again with the passing of a reference level by the focus error signal and the tracking error signal, and wherein the post-defect period processing is ended and defect processing begins again with reoccurrence of a defect state.

5. A playback apparatus as claimed in claim 4, wherein said post-defect period processing control means includes a resetting means for resetting the length of the post-defect period processing to an initial value to prevent the post-defect period processing from being ended within less than a specified time.

6. A playback method for a playback apparatus to reproduce data recorded on a disk medium by using an optical pickup, the method comprising:

an RF signal generating step for generating an RF signal on the basis of an analog signal outputted by said optical pickup;

a data signal generating step for generating a data signal by binarizing said RF signal;

a defect signal generating step for generating a defect signal for indicating a defect on said disk medium on the basis of said RF signal;

a focus error signal generating step for generating a focus error signal on the basis of said analog signal outputted by said optical pickup;

a focus servo control step for controlling a focus servo of said optical pickup in response to said focus error signal;

a tracking error signal generating step for generating a tracking error signal on the basis of said analog signal outputted by said optical pickup;

a tracking servo control step for controlling a tracking servo of said optical pickup in response to said tracking error signal;

a monitoring step for monitoring said defect signal and thereby detecting a start and an end of a defect period;

a defect period processing control step for controlling processing of said focus servo control step and processing of said tracking servo control step so that defect period processing is performed when a result of the monitoring by processing of said monitoring step indicates said defect period, wherein the defect period processing includes controlling said focus servo control step and said tracking servo control step so that at least one of said focus servo and said tracking servo is not energized; and a post-defect period processing control step for controlling the processing of said focus servo control step and the processing of said tracking servo control step so that post-defect period processing is performed when a result of the monitoring by the processing of said monitoring step indicates the end of said defect period, wherein the post-defect period processing is ended and defect processing begins again when passage of a predetermined time after turning post-stage switches to the terminal side, wherein the post-defect period processing is ended and defect processing begins again with the passing of a reference level by the focus error signal and the tracking error signal, and wherein the post-defect period processing is ended and defect processing begins again with reoccurrence of a defect state.

7. A playback method as claimed in claim 6, wherein said post-defect period processing control step includes resetting the length of the post-defect period processing to an initial value to prevent the post-defect period processing from being ended within less than a specified time.

* * * * *

UNITED STATES PATENT AND TRADEMARK OFFICE
CERTIFICATE OF CORRECTION

| | | |
|---|---|---|
| PATENT NO. | : 7,313,059 B2 | Page 1 of 1 |
| APPLICATION NO. | : 11/112485 | |
| DATED | : December 25, 2007 | |
| INVENTOR(S) | : Makoto Nishigaki | |

It is certified that error appears in the above-identified patent and that said Letters Patent is hereby corrected as shown below:

Foreign Priority Application Data should read as follows:

Title page, item (30) November 14, 2000…(JP)………...2000-346677

Signed and Sealed this

Seventeenth Day of June, 2008

JON W. DUDAS
*Director of the United States Patent and Trademark Office*